United States Patent [19]
Pillon et al.

[11] 3,929,805
[45] Dec. 30, 1975

[54] CERTAIN 4H-(2,3D)PYRIDO-1,3,2-DIOXAPHOS-PHORINANES

[75] Inventors: Daniel Pillon; Jacques Ducret, both of Lyon; Daniel Demozay, Villeurbanne, all of France

[73] Assignee: Pepro, Societe pour le Developement et la Vent de Specialities, Lyon, France

[22] Filed: Oct. 13, 1972

[21] Appl. No.: 297,316

[30] Foreign Application Priority Data
Oct. 20, 1971   France .............................. 71.38520

[52] U.S. Cl. ................ 260/294.8 C; 260/294.8 K; 260/296 B; 260/297 B; 424/263
[51] Int. Cl.² ...................................... C07D 213/62
[58] Field of Search ......... 260/294.8 C, 297 B, 936, 260/937

[56] References Cited
UNITED STATES PATENTS
3,094,458   6/1963   Chiddix et al. ...................... 260/936

OTHER PUBLICATIONS
Houben–Weyl, Methoden Der Organishen Chemie, Band X11/2 Verlag Publishers pp. 241 & 321 (1964).

*Primary Examiner*—Alan L. Rotman
*Attorney, Agent, or Firm*—Browdy and Neimark

[57] ABSTRACT

Cyclic derivatives of phosphoric or amidophosphoric acid, and their method of preparation, corresponding to the general formula

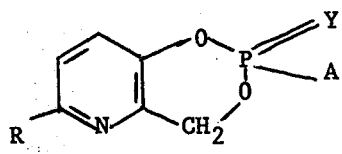

in which R represents hydrogen or a methyl radical, A represents a halogen, an optionally substituted alkoxy or alkylthio radical, an alkyl, phenyl, amino, monoalkylamino or dialkylamino radical, the hydrocarbon portion of the aforementioned radicals containing from 1 to 4 carbon atoms, Y represents sulfur or oxygen. These compounds have insecticidal and acaricidal properties.

4 Claims, No Drawings

CERTAIN 4H-(2,3D)PYRIDO-1,3,2-DIOXAPHOSPHORINANES

This invention relates to cyclic derivatives of phosphoric, phosphonic or amidophosphoric acid and their monothio- or polythio-homologues as novel industrial products. The invention also relates to a process for the preparation of these compounds. Finally, the invention relates to the use of these compounds as active materials of pesticidal compositions, insecticides in particular.

The compounds according to the invention correspond to the general formula

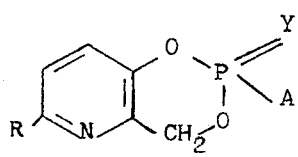

in which
R represents hydrogen or a methyl radical,
A represents a halogen, an optionally substituted alkoxy or alkylthio radical, an alkyl, phenyl, amino, monoalkylamino or dialkylamino radical, the hydrocarbon portion of the aforementioned radicals containing from 1 to 4 carbon atoms,
Y represents sulphur or oxygen.

The compounds according to the invention are prepared by reacting a dichloride of a phosphoric, phosphonic or amidophosphoric acid or one of their monothio or polythio homologues with a suitable derivative of a 2-hydroxymethyl-3-hydroxy pyridine in accordance with the following scheme:

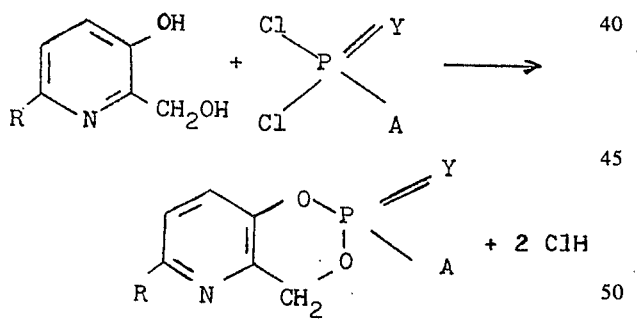

in which R, A and Y are as defined above.

This reaction is generally carried out in the presence of a hydracid acceptor, such as an alkali metal carbonate, trimethyl amine, triethyl amine, pyridine.

Depending upon the type of compounds it is desired to obtain, the pyridine derivative will be an optionally methylated 2-hydroxymethyl-3-hydroxy pyridine or a salt, for example an alkali metal salt, of one of these derivatives.

The reaction can generally be carried out without any particular difficulty, occasionally taking place at ambient temperature, although some heating is often necessary to accelerate the reaction. In general, temperatures of from 20°C to 80°C are suitable for carrying out the reaction.

The reaction is generally carried out in a suitable organic solvent such as a ketone, for example acetone, isobutyl ketone, methylbutyl ketone; aliphatic or aromatic hydrocarbons such as benzene, xylene; ethers, chlorinated hydrocarbons (chloroform, methylene chloride) or any other solvent commonly used in organic syntheses such as dimethyl formamide or dimethyl sulphoxide.

The compounds in which Y = S can also be obtained by reacting phosphorus thiochloride with a suitable 2-hydroxymethyl-3-hydroxy pyridine. The reaction product is a cyclic acid chloride which itself can be condensed with hydroxylated reactants, mercaptans or amino derivatives defined by the various values of the radical A in accordance with the following reaction scheme:

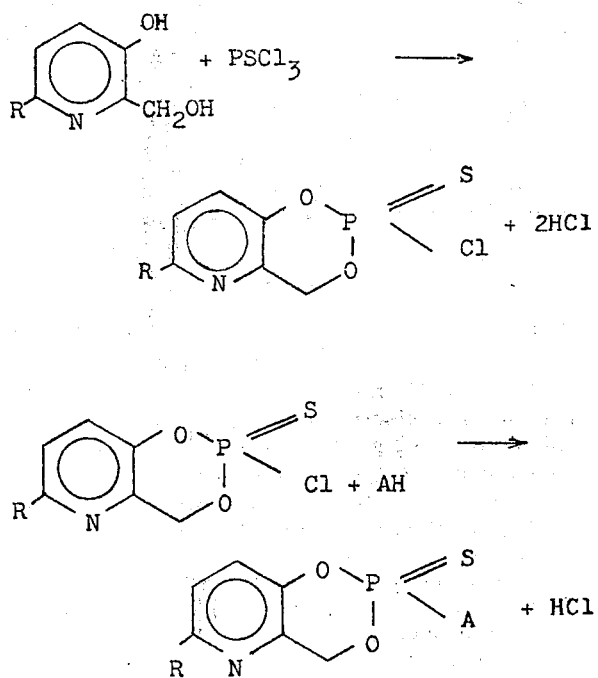

Like the preceding reactions, these reactions are generally carried out in the presence of an acid acceptor such as an alkali metal carbonate, trimethyl amine, triethyl amine, pyridine or the amine itself where AH represents an amine.

Among the compounds obtained by the process described above, reference is made to the compounds listed in the following Table.

| No. | A | Y | R |
|---|---|---|---|
| 1 | $OCH_3$ | O | H |
| 2 | $OCH_3$ | O | $CH_3$ |
| 3 | $OCH_3$ | S | H |
| 4 | $OCH_3$ | S | $CH_3$ |
| 5 | $OC_2H_5$ | O | H |
| 6 | $OC_2H_5$ | O | $CH_3$ |
| 7 | $OC_2H_5$ | S | H |

-continued

| No. | A | Y | R |
|---|---|---|---|
| 8 | OC₂H₅ | S | CH₃ |
| 9 | OC₃H₇ | O | H |
| 10 | OC₃H₇ | O | CH₃ |
| 11 | OC₃H₇ | S | H |
| 12 | OC₃H₇ | S | CH₃ |
| 13 | O—iso—C₃H₇ | O | H |
| 14 | O—iso—C₃H₇ | O | CH₃ |
| 15 | O—iso—C₃H₇ | S | H |
| 16 | O—iso—C₃H₇ | S | CH₃ |
| 17 | OC₄H₉ | O | H |
| 18 | OC₄H₉ | O | CH₃ |
| 19 | OC₄H₉ | S | CH₃ |
| 20 | OC₂H₄—OCH₃ | O | CH₃ |
| 21 | OC₂H₄—OCH₃ | S | CH₃ |
| 22 | SCH₃ | O | H |
| 23 | SCH₃ | O | CH₃ |
| 24 | SCH₃ | S | H |
| 25 | SCH₃ | S | CH₃ |
| 26 | CH₃ | O | CH₃ |
| 27 | CH₃ | S | CH₃ |
| 28 | C₂H₅ | S | H |
| 29 | C₂H₅ | S | CH₃ |
| 30 | iso—C₃H₇ | S | CH₃ |
| 31 | C₆H₅ | O | H |
| 32 | C₆H₅ | O | CH₃ |
| 33 | C₆H₅ | S | H |
| 34 | C₆H₅ | S | CH₃ |
| 35 | NH₂ | S | CH₃ |
| 36 | NH₂ | O | H |
| 37 | NH₂ | O | CH₃ |
| 38 | NH₂ | S | H |
| 39 | NHCH₃ | S | CH₃ |
| 40 | N(CH₃)₂ | O | CH₃ |
| 41 | N(CH₃)₂ | S | CH₃ |
| 42 | NHC₂H₅ | S | CH₃ |
| 43 | NH—iso—C₃H₇ | O | H |
| 44 | NH—iso—C₃H₇ | O | CH₃ |
| 45 | NH—iso—C₃H₇ | S | CH₃ |

EXAMPLE I 2-oxo-2-methoxy-4-H-(3,2-d)-pyrido-1,3,2-dioxaphosphorinane 12.4 g (0.077 mol) of 2-hydroxymethyl-3-hydroxy pyridine hydrochloride are suspended in 200 ml of chloroform. 23.2 g (0.23 mol) of triethyl amine are then run in, the hydrochloride disappearing. 10.4 g (0.07 mol) of O-methyl dichlorophosphate are then added and the mixture left to react for 1 hour at 40°C.

The solution is cooled, washed once with water, once with 5% sodium bicarbonate and twice with water until the Cl⁻ ions disappear. The product is dried over magnesium sulphate.

The chloroform is removed, leaving an oil which, although it can be crystallised cold, has a very low melting point and goes over again in the form of an oil at ambient temperature. The product is then dried in a high vacuum and kept in crude form.

$n_D^{20} = 1.5170$

Yield: 36 %

Analysis for C₇H₈NO₄P

| Analysis: | C % | H % | N % | P % |
|---|---|---|---|---|
| Calculated: | 41.78 | 3.98 | 6.96 | 15.22 |
| Found: | 41.84 | 4.06 | 6.95 | 15.33 |

EXAMPLE II 2-oxo-2-methoxy-4-H-6-methyl-(3,2-d)-pyrido-1,3,2-dioxaphosphorinane 13.9 g (0.1 mol) of 2-hydroxymethyl-3-hydroxy-6-methyl pyridine are dissolved under reflux in 200 ml of acetone, 32 g (0.23 mol) of potassium carbonate are added and the suspension left under reflux for 1 hour. 13.4 g (0.09 mol) of O-methyl dichlorophosphate are gradually added at 40°C. The reactants are left for 1 hour at 40°C. After the acetone has been removed, a pink-coloured oil is left behind which is extracted with cyclohexane, giving a crystallised whitish-pink product.

Melting point: 75°C

Yield: 63 %

Analysis for C₈H₁₀NO₄P

| Analysis: | C % | H % | N % | P % |
|---|---|---|---|---|
| Calculated: | 44.60 | 4.65 | 6.51 | 14.41 |
| Found: | 44.62 | 4.59 | 6.55 | 14.38 |

EXAMPLE III 2-methoxy-2-thio-4-H-(3,2-d)-pyrido-1,3,2-dioxaphosphorinane

O-methyl dichlorothiophosphate is reacted with 2-hydroxymethyl-3-hydroxy pyridine by the procedure described in Example II.

Melting point: 62° – 63°C

Yield: 29 %

Analysis for C₇H₈NO₃PS

| Analysis: | C % | H % | N % | P % |
|---|---|---|---|---|
| Calculated: | 38.71 | 3.68 | 6.45 | 14.28 |
| Found: | 38.80 | 3.80 | 6.42 | 14.30 |

EXAMPLE IV 2-thio-2-methoxy-4-H-6-methyl-(3,2-d)-pyrido-1,3,2-dioxaphosphorinane O-methyl dichlorothiophosphate is reacted with 2-hydroxymethyl-3-hydroxy-6-methyl pyridine by the procedure described in Example II.

After the reactants have been mixed, the reaction is allowed to continue for 30 minutes at 50°C. The product crystallises in the cold in the form of a white powder.

Melting point: 70°C

Yield: 65 % (from the acid chloride)

Analysis for C₈H₁₀NO₃PS

| Analysis: | C % | H % | N % | P % |
|---|---|---|---|---|
| Calculated: | 41.56 | 4.33 | 6.06 | 13.42 |
| Found: | 41.55 | 4.33 | 6.04 | 13.47 |

EXAMPLE V 2-oxo-2-ethoxy-4-H-(3,2-d)-pyrido-1,3,2-dioxaphosphorinane

Following the procedure described in Example II, O-ethyl dichlorophosphate is reacted with 2-hydroxymethyl-3-hydroxy pyridine. After the product has been extracted with cyclohexane and the cyclohexane removed, an oil which is extremely difficult to crystallise is obtained. It is recrystallised from a very small quantity of sulphuric ether.

Melting point: 41°C

Yield: 25 %

Analysis for C₈H₁₀NO₄P

| Analysis: | C % | H % | N % | P % |
|---|---|---|---|---|
| Calculated: | 44.65 | 4.65 | 6.51 | 14.41 |
| Found: | 44.75 | 4.80 | 6.60 | 14.42 |

EXAMPLE VI 2-ethoxy-2-oxo-4-H-6-methyl-(3,2-d)-pyrido-1,3,2-dioxaphosphorinane Following the procedure described in Example II, O-ethyl dichlorophosphate is reacted with 2-hydroxymethyl-3-hydroxy-6-methyl pyridine.
  Melting point: 72° – 73°C
  Yield: 62 %

Analysis for $C_9H_{12}NO_4P$

| Analysis: | C % | H % | N % | P % |
|---|---|---|---|---|
| Calculated: | 47.21 | 5.24 | 5.12 | 13.52 |
| Found: | 47.12 | 5.22 | 6.14 | 13.49 |

EXAMPLE VII 2-ethoxy-2-thio-4-H-(3,2-d)-pyrido-1,3,2-dioxaphosphorinane

Following the procedure described in Example II, O-ethyl dichlorothiophosphate is reacted with 2-hydroxymethyl-3-hydroxy pyridine.
  Melting point: 56°C
  Yield: 53 %

Analysis for $C_8H_{10}NO_3PS$

| Analysis: | C % | H % | N % | P % |
|---|---|---|---|---|
| Calculated: | 41.55 | 4.33 | 6.06 | 13.41 |
| Found: | 41.80 | 4.04 | 6.08 | 13.47 |

EXAMPLE VIII 2-thio-2-ethoxy-4-H-6-methyl-(3,2-d)-pyrido-1,3,2-dioxaphosphorinane Following the procedure described in Example II, O-ethyl dichlorothiophosphate is reacted with 2-hydroxymethyl-3-hydroxy-6-methyl pyridine.
  Melting point: 49 – 50°C
  Yield: 73.5%

Analysis for $C_9H_{12}NO_3PS$

| Analysis: | C % | H % | N % | P % |
|---|---|---|---|---|
| Calculated: | 45.98 | 5.11 | 5.96 | 13.20 |
| Found: | 45.70 | 4.93 | 5.88 | 12.95 |

EXAMPLE IX 2-n-butoxy-2-thio-4-H-6-methyl-(3,2-d)-pyrido-1,3,2-dioxaphosphorinane Following the procedure described in Example II, O-n-butyl dichlorothiophosphate is reacted with 2-hydroxymethyl-3-hydroxy-6-methyl pyridine.
  Melting point: 40° – 42°C
  Yield: 44 %

Analysis for $C_{11}H_{16}NO_3PS$

| Analysis: | C % | H % | N % | P % |
|---|---|---|---|---|
| Calculated: | 48.35 | 5.86 | 5.14 | 11.38 |
| Found: | 48.19 | 5.87 | 5.09 | 11.40 |

EXAMPLE X 2-(β-methoxy)-ethoxy-2-oxo-4-H-6-methyl-(3,2-d)-1,3,2-dioxaphosphorinane This compound is obtained by reacting O-(β-methoxy)ethyl dichlorophosphate with 2-hydroxymethyl-3-hydroxy-6-methyl pyridine in accordance with the procedure described in Example II.
  Melting point: 70° – 71°C
  Yield: 25 %

Analysis for $C_{10}H_{14}NO_5P$

| Analysis: | C % | H % | N % | P % |
|---|---|---|---|---|
| Calculated: | 46.41 | 5.41 | 5.41 | 11.96 |
| Found: | 46.39 | 5.08 | 5.40 | 12.05 |

EXAMPLE XI 2-(β-methoxy)-ethoxy-2-thio-4-H-6-methyl-(3,2-d)pyrido-1,3,2-dioxaphosphorinane Following the procedure of Example II, O-(β-methoxy)ethyl dichlorothiophosphate is reacted with 2-hydroxymethyl-3-hydroxy-6-methyl pyridine.
  Melting point: 58° – 60°C
  Yield: 73 %

Analysis for $C_{10}H_{14}NO_4PS$

| Analysis: | C % | H % | N % | P % |
|---|---|---|---|---|
| Calculated: | 43.68 | 5.09 | 5.09 | 11.29 |
| Found: | 43.66 | 5.14 | 5.09 | 11.16 |

EXAMPLE XII 2-methylthio-2-oxo-4-H-6-methyl-(3,2-d)-pyrido-1,3,2-dioxaphosphorinane Following the procedure described in Example II, S-methyl dichlorothiophosphate is reacted with 2-hydroxymethyl-3-hydroxy-6-methyl pyridine.
  Melting point: 64° – 66°C
  Yield: 20 %

Analysis for $C_8H_{10}NO_3PS$

| Analysis: | C % | H % | N % | P % |
|---|---|---|---|---|
| Calculated: | 41.56 | 4.33 | 6.04 | 13.47 |
| Found: | 41.56 | 4.40 | 6.08 | 13.39 |

EXAMPLE XIII 2-methylthio-2-thio-4-H-6-methyl-(3,2-d)-pyrido-1,3,2-dioxaphosphorinane Following the procedure described in Example II, S-methyl dichlorodithiophosphate is reacted with 2-hydroxymethyl-3-hydroxy-6-methyl pyridine.
  Highly viscous fusion
  Yield: 25 %

Analysis for $C_8H_{10}NO_2PS_2$

| Analysis: | C % | H % | N % | P % |
|---|---|---|---|---|
| Calculated: | 38.86 | 4.05 | 5.67 | 12.55 |
| Found: | 38.93 | 4.06 | 5.68 | 12.57 |

EXAMPLE XIV 2-methyl-2-oxo-4-H-6-methyl-(3,2-d)-pyrido-1,3,2-dioxaphosphorinane This compound is obtained by reacting methyl phosphonic acid dichloride with 2-hydroxymethyl-3-hydroxy-6-methyl pyridine in accordance with the procedure described in Example II.
  Melting point: 90° – 92°C
  Yield: 20 %

Analysis for $C_8H_{10}NO_3P$

| Analysis: | C % | H % | N % | P % |
|---|---|---|---|---|

EXAMPLE XV 2-methyl-2-thio-4-H-6-methyl-(3,2-d)-pyrido-1,3,2-dioxaphosphorinane This compound is obtained by reacting methyl thiophosphonic acid dichloride with 2-hydroxymethyl-3-hydroxy-6-methyl pyridine in accordance with the procedure described in Example II.

Melting point: 78° – 79°C
Yield: 70 %

Analysis for $C_8H_{10}NO_2PS$

| Analysis: | C % | H % | N % | P % |
|---|---|---|---|---|
| Calculated: | 44.62 | 4.65 | 6.54 | 14.41 |
| Found: | 44.68 | 4.63 | 6.58 | 14.41 |

(continued from previous page)

| | | | | |
|---|---|---|---|---|
| Calculated: | 48.24 | 5.03 | 7.03 | 15.57 |
| Found: | 48.16 | 5.09 | 7.04 | 15.58 |

EXAMPLE XVI 2-ethyl-2-thio-4-H-(3,2-d)-pyrido-1,3,2-dioxaphosphorinane

Following the procedure described in Example II, ethyl thiophosphonic acid dichloride is reacted with 2-hydroxymethyl-3-hydroxy pyridine.

Melting point: 30°C
Yield: 56.5 %

Analysis for $C_8H_{10}NO_2PS$

| Analysis: | C % | H % | N % | P % |
|---|---|---|---|---|
| Calculated: | 44.55 | 4.65 | 6.51 | 14.41 |
| Found: | 44.39 | 5.10 | 6.43 | 14.39 |

EXAMPLE XVII 2-ethyl-2-thio-4-H-6-methyl-(3,2-d)-pyrido-1,3,2-dioxaphosphorinane Following the procedure described in Example II, ethyl thiophosphonic acid dichloride is reacted with 2-hydroxymethyl-3-hydroxy-6-methyl pyridine.

Melting point: 80° – 82°C
Yield: 70 %

Analysis for $C_9H_{12}NO_2PS$

| Analysis: | C % | H % | N % | P % |
|---|---|---|---|---|
| Calculated: | 47.16 | 5.24 | 6.12 | 13.52 |
| Found: | 47.14 | 5.25 | 6.08 | 13.60 |

EXAMPLE XVIII 2-isopropyl-2-thio-4-H-6-methyl-(3,2-d)-pyrido-1,3,2-dioxaphosphorinane Following the procedure described in Example II, isopropyl thiophosphonic acid dichloride is reacted with 2-hydroxymethyl-3-hydroxy-6-methyl pyridine.

Melting point: 57°C
Yield: 75 %

Analysis for $C_{10}H_{14}NO_2PS$

| Analysis: | C % | H % | N % | P % |
|---|---|---|---|---|
| Calculated: | 48.48 | 5.76 | 5.76 | 12.76 |
| Found: | 47.93 | 6.08 | 5.78 | 13.24 |

EXAMPLE XIX 2-phenyl-2-oxo-4-H-6-methyl-(3,2-d)-pyrido-1,3,2-dioxaphosphorinane Following the procedure described in Example II, phenyl phosphonic acid dichloride is reacted with 2-hydroxymethyl-3-hydroxy-6-methyl pyridine.

Melting point: 94° – 95°C
Yield: 58 %

Analysis for $C_{13}H_{12}NO_3P$

| Analysis: | C % | H % | N % | P % |
|---|---|---|---|---|
| Calculated: | 59.76 | 4.60 | 5.37 | 11.87 |
| Found: | 59.66 | 4.62 | 5.38 | 11.78 |

EXAMPLE XX 2-thio-2-phenyl-4-H-(3,2-d)-pyrido-1,3,2-dioxaphosphorinane

This compound is obtained by reacting phenyl dichlorothiophosphonate with 2-hydroxymethyl-3-hydroxy pyridine in accordance with the procedure described in Example II.

Melting point: 74°C
Yield: 35 %

Analysis for $C_{12}H_{10}NO_2PS$

| Analysis: | C % | H % | N % | P % |
|---|---|---|---|---|
| Calculated: | 54.75 | 3.80 | 5.32 | 11.78 |
| Found: | 54.84 | 3.85 | 5.28 | 11.80 |

EXAMPLE XXI 2-phenyl-2-thio-4-H-6-methyl-(3,2-d)-pyrido-1,3,2-dioxaphosphorinane Following the procedure described in Example II, phenyl thiophosphonic acid dichloride is reacted with 2-hydroxymethyl-3-hydroxy-6-methyl pyridine.

Yield: 86 %
Melting point: 94°C

Analysis for $C_{13}H_{12}NO_2PS$

| Analysis: | C % | H % | N % | P % |
|---|---|---|---|---|
| Calculated: | 56.45 | 4.33 | 5.06 | 11.20 |
| Found: | 56.50 | 4.03 | 5.04 | 11.19 |

EXAMPLE XXII 2-chloro-2-thio-4-H-6-methyl-(3,2-d)-pyrido-1,3,2-dioxaphosphorinane 69.5 g (0.5 mol) of 2-hydroxymethyl-3-hydroxy-6-methyl pyridine are dissolved under reflux in 2 liters of acetone. After dissolution, the solution is cooled to 40°C. 85 g (0.5 mol) of phosphorus thiochloride are added at 40°C, resulting in the formation of a precipitate. The reactants are left for 30 minutes at 40°C and then cooled to 30°C. 101 g (1 mol) of triethyl amine are added at 30°C, after which the reactants are left at this temperature for 30 minutes. The solution is filtered and the acetone removed from the filtrate, leaving a pink oil which is extracted with cyclohexane. A white product is obtained by crystallisation in cyclohexane.

Melting point: 89°C
Yield: 74 %

EXAMPLE XXIII 2-thio-2-amino-4-H-6-methyl-(3,2-d)-pyrido-1,3,2-dioxaphosphorinane 23.5 g (0.1 mol) of 2-chloro-2-thio-4-H-6-methyl(3,2-d)-pyrido-1,3,2-dioxaphosphorinane are dissolved in 300 ml of acetone. 17 g (0.35 mol) of ammonia are introduced into the solution by bubbling at a temperature kept at 20°C. After the addition, the precipitate is filtered and the acetone removed from the filtrate, leaving a white precipitate which is recrystallised from isopropanol.

Melting point: 135°C
Yield: 85 %

Analysis for $C_7H_9N_2O_2PS$

| Analysis: | C % | H % | N % | P % |
|---|---|---|---|---|
| Calculated: | 38.92 | 4.16 | 12.96 | 14.35 |
| Found: | 38.94 | 4.18 | 12.98 | 14.33 |

EXAMPLE XXIV 2-thio-2-methylamino-4-H-6-methyl-(3,2-d)-pyrido-1,3,2-dioxaphosphorinane This compound is obtained by reacting methylamine with 2-chloro-2-thio-4-H-6-methyl-(3,2-d)-pyrido-1,3,2-dioxaphosphorinane in accordance with the procedure described in Example XXIII.

Melting point: 103°–106°C
Yield: 80 %

Analysis for $C_8H_{11}N_2O_2PS$

| Analsysis: | C % | H % | N % | P % |
|---|---|---|---|---|
| Calculated: | 41.74 | 4.80 | 12.18 | 13.47 |
| Found: | 41.93 | 4.89 | 12.11 | 13.41 |

EXAMPLE XXV 2-thio-2-dimethylamino-4-H-6-methyl-(3,2-d)-pyrido-1,3,2-dioxaphosphorinane This compound is obtained by reacting dimethylamine with 2-chloro-2-thio-4-H-6-methyl-(3,2-d)-pyrido-1,3,2-dioxaphosphorinane in accordance with the procedure described in Example XXIII.

Melting point: 98° – 99°C
Yield: 88 %

Analysis for $C_9H_{13}N_2O_2PS$

| Analysis: | C % | H % | N % | P % |
|---|---|---|---|---|
| Calculated: | 44.26 | 5.33 | 11.48 | 12.71 |
| Found: | 44.21 | 5.27 | 11.47 | 12.80 |

EXAMPLE XXVI 2-oxo-2-isopropylamino-4-H-(3,2-d)-pyrido-,1,3,2-dioxaphosphorinane This compound is obtained by reacting isopropyl amino dichlorophosphate with 2-hydroxymethyl-3-hydroxy pyridine hydrochloride in accordance with the procedure described in Example I.

Melting point: 106°C
Yield: 27.6 %

Analysis for $C_9H_{13}N_2O_3P$

| Analysis: | C % | H % | N % | P % |
|---|---|---|---|---|
| Calculated: | 47.36 | 5.70 | 12.28 | 13.59 |
| Found: | 47.28 | 5.76 | 12.25 | 13.70 |

EXAMPLE XXVII 2-oxo-2-isopropylamino-4-H-6-methyl-(3,2-d)-pyrido-1,3,2-dioxaphosphorinane This compound is obtained by reacting isopropylaminodichlorophosphate with 2-hydroxymethyl-3-hydroxy-6-methyl pyridine in accordance with the procedure described in Example II.

Melting point: 80° – 82°C
Yield: 23 %

Analysis for $C_{10}H_{15}N_2O_3P$

| Analysis: | C % | H % | N % | P % |
|---|---|---|---|---|
| Calculated: | 49.55 | 6.20 | 11.57 | 12.80 |
| Found: | 49.78 | 5.86 | 11.60 | 12.88 |

EXAMPLE XXVIII 2-thio-2-isopropylamino-4-H-6-methyl-(3,2-d)-pyrido-1,3,2-dioxaphosphorinane This compound is obtained by reacting isopropylamino dichlorothiophosphate with 2-hydroxymethyl-3-hydroxy-6-methyl pyridine in accordance with the procedure described in Example II.

Melting point: 110°C
Yield: 53 %

Analysis for $C_{10}H_{15}N_2O_2PS$

| Analysis: | C % | H % | N % | P % |
|---|---|---|---|---|
| Calculated: | 46.51 | 5.82 | 10.85 | 12.00 |
| Found: | 46.48 | 5.87 | 10.83 | 12.05 |

The compounds according to the invention show fairly remarkable insecticidal and acaricidal properties. Naturally, these compounds show fairly different levels of activity both from the point of view of the insects which they destroy and from the point of view of the doses in which they are active, depending upon the nature of the different radicals A, Y and R. The following examples describe in detail different tests to which these compounds were subjected and the results obtained. The tests in question are purely indicative tests demonstrating the activity of the compounds without in any way limiting their field of application to the parasites specifically mentioned.

Tests on mosquito larvae (*Aedes aegypti*)

50 cc of a solution of a product in the dose in which it is desired to test effectiveness are placed in glass jars. 10 mosquito larvae are then introduced into each of the jars. 2 days after the treatment, the dead larvae are counted and the percentage mortality established.

In this test, products Nos. 21, 28, 30, 35, 41, 43 and 45 produce total mortality in doses of 10 mg/l upwards, whilst products 1, 2, 3, 4, 6, 8, 25 and 42 produce total mortality in doses of 0.1 mg/l upwards.

Tests on the corn weevil (*Calandra granaria*)

5 cc of an acetone solution of the active material in the dose in which it is desired to test activity are applied by means of a spray tower. Following evaporation of the acetone, 100 adult weevils are placed on a plate of glass and are kept on the plate treated for 2 hours.

The weevils are then placed in Petri dishes for 10 days during which they are fed normally. After 10 days, the results are assessed by evaluating the number of dead weevils.

Under these conditions, products Nos. 1, 2, 3, 5, 25 and 28 produce total mortality in doses of 100 mg/l upwards, products Nos. 8, 27 and 39 produce total mortality in doses of 50 mg/l upwards and product No. 4 produces total mortality in a dose of 10 mg/l upwards and 90 % mortality in half the dose.

This is particularly remarkable when it is considered that D.D.T. has to be used in a dose of 500 mg/l, malathion and parathion in doses of 50 mg/l to give only 50 % mortality (DL 50) under the same conditions.

Tests on flies (*Musca domestica*)

10 adult flies 4 to 5 days old are placed in a Petri dish covered with netting. the Petri dishes are directly treated by means of a spray tower by applying 5 cc of an acetone solution of the product to be tested in the dose in which it is desired to measure activity. Counting is carried out 2 hours after the treatment.

Under these conditions, products Nos. 25 and 26 produce total mortality in a dose of 0.1 g/l upwards, whilst products Nos. 1, 2, 3, 4, 5, 6, 8, 27, 28, 29 and 30 produce total mortality in a dose of 0.05 g/l upwards, mortality still being substantially complete in a dose of 0.01 g/l for products Nos. 2, 4, 5, 8 and 28 and still complete in a dose of 0.005 g/l for product No. 3.

A comparison can be made with commercially used insecticides belonging to the same chemical family (phosphoric esters) as the products according to the invention.

Thus, the minimum concentrations of various products used in the same test to obtain 100 % mortality are as follows:
- Azinphos-ethyl : S-[3,4-dihydro-4-oxobenzo(d)-(1,2,3)triazin-3-yl methyl]-diethyl phosphorothiolothionate : minimum concentration 0.5 g/l.
- Monocrotophos : dimethyl cis-1-methyl-2-methyl carbamoylvinyl phosphate : minimum concentration 0.5 g/l.
- Oxydemeton-methyl : S- [2-(ethylsulphinyl)-ethyl]-dimethyl phosphorothioate : minimum concentration 0.5 g/l.
- Dimethoate : dimethyl S-(N-methyl carbamoylmethyl)-phosphorothiolothionate : minimum concentration 0.1 g/l.
- Dursban : 0,0-diethyl-0-(3,5,6-trichloropyridyl-2)phosphorothioate : minimum concentration 0.1 g/l.

Tests on cockroaches (*Blatella germanica*)

5 adult germanic cockroaches are placed in a Petri dish covered with netting. The Petri dishes are directly treated by means of a spray tower by applying 5 cc of an acetone solution of the active material studied in the required concentration.

Under these conditions, total mortality of the cockroaches is obtained
- in a dose of 0.1 g/l upwards with products 26, 41 and 45,
- in a dose of 0.5 g/l upwards with products 19, 21, 25, 30 and 35,
- in a dose of 0.05 g/l with products 1, 2, 3, 4, 5, 6 and 39.

By way of comparison, it can be pointed out that, to obtain the same result, doses of 1 g/l are necessary with such products as azinphos-ethyl, D.D.T., dimethoate, malathion (S- 1,2-di-(ethoxy carbonyl)-ethyl dimethyl phosphorthiolothionate) and phosalone (S-(6-chloro-2-oxobenzoxazolin-3-yl)-methyl diethyl phosphorthiolothionate).

Tests on *Prodenia litura*

Larvae of *Prodenia litura* of the same age weighing about 60 mg are removed from an incubator. These larvae are placed in Petri dishes the bottom of which has been covered with a 2 to 3 mm layer of an agar-containing nutrient medium intended to ensure the survival of the larvae for the duration of the test. 5 larvae are placed in each dish with two repetitions per dose. The Petri dishes are treated in a spray tower with the product to be tested in the required concentration.

Under these conditions, the products of examples 2, 3, 4 and 39 produce total mortality in a dose of 50 g/hl upwards; the product of example 39 still produces total mortality in a dose of 25 g/hl whilst, in a dose of 10g/hl, products Nos. 3 and 4 still produce total mortality. This is remarkable because the best of the currently available products for controlling this parasite, such as endrine (1, 2, 3, 4, 10, 10-hexachloro-6,7-epoxy-1,4,4a,5,6,7,8,8a-octahydro-exo-1,4-exo-5,8-dimethanonaphthalene), parathion (diethyl-4-nitrophenyl phosphorothionate), azinphos-ethyl (S-(3,4-dihydro-4-oxobenzo[d]-[1,2,3]-triazin-3-yl methyl)-diethyl phosphorothiolothionate) have to be used in doses from 3 to 10 times larger to obtain the same result.

Tests on Colorado beetle (*Leptinotarsa decemlineata*)

Larvae of *Leptinotarsa decemlineata* are removed in the open and placed on bunches of potato-plant leaves kept surviving for 48 hours.

The required quantities of active material to be tested are sprayed on with a suitable device. The percentage mortality is evaluated after 48 hours.

Under these conditions, product No. 4 produces total mortality in a dose of 10 g/hl upwards.

The versatility of these compounds enables them to be used in the control of parasites affecting a variety of different plants in agriculture, arboriculture, viticulture and in the domestic field or in the public health field, the choice of one or other of the aforementioned products being governed by the type of parasite to be controlled and by the characteristics of the product (toxicity, activity range, etc.). Under conditions of practical use, the doses in which the products are used can vary within wide limits, depending upon the nature of the insects to be controlled and the activity of the products. Generally speaking, doses of from a few grams to a few hundred grams per hectoliter will be suitable.

The greenhouse tests were completed by a series of open-air experiments which confirmed the remarkable versatility of the products according to the invention by virtue of their activity in particular on diptera such as: mosquitoes (*Aedes aegypti*) and flies (domestic or leguminous); coleoptera such as Colorado beetles (*Leptinotarsa decemlineata*), weevils (*Curculionidae, Calendra granaria, Calendra oryzae*) and bruchi; lepidoptera such as: the wine moth (*Polychrosis botrana, Clysia ambiguella*), *Sparanothis pilleriana*, the corn borer (*Pyrausta nubilalis*), hyponomeutae (*Hyponomeuta* sp.), tinea (*Ephestia kuhniella*), cutworms or noctuids (Noctuidae) such as *Prodenia litura*, bollworms, borers; homoptera such as: psyllids (*Psylla piri*), aphids (*Aphis fabae, Myzus persicae*); aleurodes (*Trialeurodes vapora-* rium, *Bemisia*), cicadae, heteroptera (*Dysdercus* sp.); orthoptera such as acaridae, such as cockroaches (*Blatella germanica*).

This list is by no means limiting because the products according to the invention can be used against: carpocapse (*Carpocapsa pomonella*), tortricid (Laspeyresia sp.), altises (*Psilloides chrysocephala*), blaniules (*Blaniulus guttulatus*, *Archiboreiulus pallidus*), cecidomyiae (*Contarinia* sp.), pegomyiae (*Pegomyia hyoscyami*, *Pegomyia betae*), elater (Elateridae), cockchafer or grubs (*Melolontha melolontha*, Popilia sp.), acaridae (Panonychus sp. or Eotetranychus sp., Tetranychus sp., Bryobia sp., Vasates sp., Eriophyes sp.), lepidoptera such as Heliothis, Earias sp., Diparopsis sp., *Pectinophora gossypiella*.

This versatile activity is coupled with an absence of phytotoxicity in particular on the majority of nutrient-value plants. For their practical use, the compounds according to the invention are rarely used on their own, instead they generally form part of formulations generally comprising a support and/or a surfactant in addition to the active material according to the invention.

In the context of the invention, a support is an organic or mineral, natural or synthetic material with which the active material is associated to facilitate its application to the plant, to seeds or to the soil, or to facilitate its transportation or its handling. The support can be solid (clays, natural or synthetic silicates, resins, waxes, solid fertilisers . . .) or liquid (water, alcohols, ketones, petroleum fractions, chlorinated hydrocarbons, liquefied gases).

The surfactant can be any ionic or non-ionic emulsifier, dispersant or wetting agent such as, for example, salts of polyacrylic acids, lignin sulphonic acids, condensates of ethylene oxide with fatty alcohols, fatty acids or fatty amines.

The compositions according to the invention can be prepared in the form of wettable powders, powders for scattering, granulates, solutions, emulsifiable concentrates, emulsions, suspended concentrates and in the form of aerosols.

The wettable powders are normally prepared in such a way that they contain from 25 to 95 % by weight of active material. In addition to a solid support, they normally contain from 0 to 5 % of a wetting agent, from 3 to 10 % by weight of a dispersant and, where necessary, from 0 to 10 % by weight of one or more stabilisers and/or other additives as penetration agents, adhesives or antiagglomerants, colorants, etc.

The powders for scattering are normally prepared in the form of a dust-form concentrate similar in composition to a wettable powder, but without the dispersant, being diluted before use with a complementary quantity of a solid support so as to obtain a composition normally containing from 0.5 to 10 % by weight of active material.

The granulates, intended to be distributed over soil, are normally prepared in such a way that they have dimensions of from 0.1 to 2 mm, being produced by agglomeration or impregnation. In general, the granulates will contain from 0.5 to 25 % of active material and from 0 to 10 % by weight of additives such as stabilisers, slow-release modifying agents, binders and solvents.

The emulsifiable concentrates which can be applied by spraying normally contain, in addition to the solvent and, when necessary, a co-solvent, from 10 to 50 % by weight/volume of active material, from 2 to 20 % by weight/volume of emulsifiers and from 0 to 20 % by weight/volume of suitable additives, such as stabilisers, penetration agents, corrosion inhibitors, colorants and adhesives.

The suspended concentrates, which can generally be applied by spraying, are prepared in such a way that a stable, non-sedimenting liquid product is obtained, and normally contain from 10 to 75 % by weight of active material, from 0.5 to 15 % by weight of surfactants, from 0.1 to 10 % by weight of anti-sedimenting agents such as protective colloids and of thixotropic agents, from 0 to 10 % by weight of suitable additives such as antifoaming agents, corrosion inhibitors, stabilisers, penetration agents and adhesives and, as support water or an organic liquid in which the active material is substantially insoluble. Certain solid organic materials or mineral salts can be dissolved in the support to assist in preventing sedimentation or as antigels for water.

Aqueous dispersions and emulsions, for example compositions obtained by diluting a wettable powder or an emulsifiable concentrate according to the invention with water, are also included within the general scope of the invention. These emulsions can be of the water-in-oil type or of the oil-in-water type and can have a thick consistency resembling that of a "mayonnaise".

Solutions in organic solvents containing from 70 to 99 % of active material are prepared for so-called "very low volume" application by spraying in the form of very fine droplets.

The compositions according to the invention can contain other ingredients, for example protective colloids, adhesives or thickeners, thioxotropic agents, stabilisers or sequestrants, together with other known active materials with pesticidal properties, more particularly insecticides or fungicides.

Finally, the products according to the invention are distinguished by a relatively low toxicity level in warm-blooded animals. For example, product No. 4 has an oral toxicity in rats (DL 50) of the order of 60 to 80 mg/kg. This is relatively low for a compound belonging to a phosphoric ester family where a toxicity lower than 10 mg/kg is quite common.

We claim:

1. A chemical derivative of phosphorus corresponding to the following general formula:

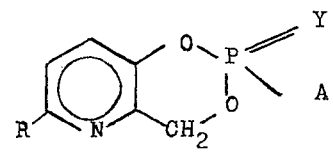

in which
R represents hydrogen or a methyl radical,
A represents a halogen, alkyl, phenyl alkoxy, alkoxyalkoxy or alkylthio radical, the alkyl portion of the aforementioned radicals containing from 1 to 4 carbon atoms, and
Y represents oxygen or sulphur.

2. 2-thio-2-methoxy-4-H-6-methyl-(3,2-d)-pyrido-1,3,2-dioxaphosphorinane in accordance with claim 1.

3. A compound having the following structure

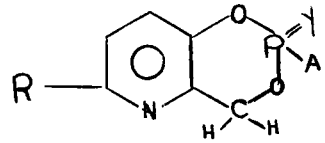

wherein
R represent hydrogen or methyl;
A represents halogen, alkyl, alkoxy or alkylthio radicals wherein the hydrocarbon portion of the aforementioned radicals contains 1 to 4 carbon atoms or phenyl and
Y represents oxygen or sulfur.

4. A compound in accordance with claim 1 wherein said alkoxy-alkoxy radical is a methoxy-alkoxy radical.

* * * * *